United States Patent [19]
Choi

[11] Patent Number: 6,159,318
[45] Date of Patent: Dec. 12, 2000

[54] METHOD FOR FORMING FIBROUS FILTER MEDIA, FILTER UNITS AND PRODUCT

[75] Inventor: Kyung-Ju Choi, Louisville, Ky.

[73] Assignee: AAF International, Inc., Louisville, Ky.

[21] Appl. No.: 09/176,665

[22] Filed: Oct. 21, 1998

[51] Int. Cl.[7] .............................. B32B 31/30; B01D 35/00
[52] U.S. Cl. .................. 156/167; 156/62.4; 156/180; 156/181; 156/285; 156/474; 264/101; 264/113; 264/518
[58] Field of Search .................................. 156/62.2, 62.4, 156/167, 180, 181, 205, 285, 473, 474; 264/101, 109, 113, 120, 121, 517, 518

[56] References Cited

U.S. PATENT DOCUMENTS

| | | |
|---|---|---|
| Re. 31,599 | 6/1984 | Rasen et al. .............................. 156/167 |
| 3,849,241 | 11/1974 | Butin et al. . |
| 3,878,014 | 4/1975 | Melead . |
| 4,042,740 | 8/1977 | Krueger . |
| 4,656,081 | 4/1987 | Ando et al. . |
| 4,936,934 | 6/1990 | Buehning . |
| 5,643,653 | 7/1997 | Griesbach, III et al. . |
| 5,725,812 | 3/1998 | Choi . |

*Primary Examiner*—Sam Chuan Yao
*Attorney, Agent, or Firm*—Polster, Lieder, Woodruff & Lucchesi, L.C.

[57] ABSTRACT

A method, apparatus and filter unit product wherein filter media fibers are fed from a media supply source to a mat forming interchangeable and movable contoured surface to contour shape a filter media mat into a preselected form for subsequent movement to a transfer zone for further contour shaping and processing into filter unit products with preselected frame arrangements.

26 Claims, 6 Drawing Sheets

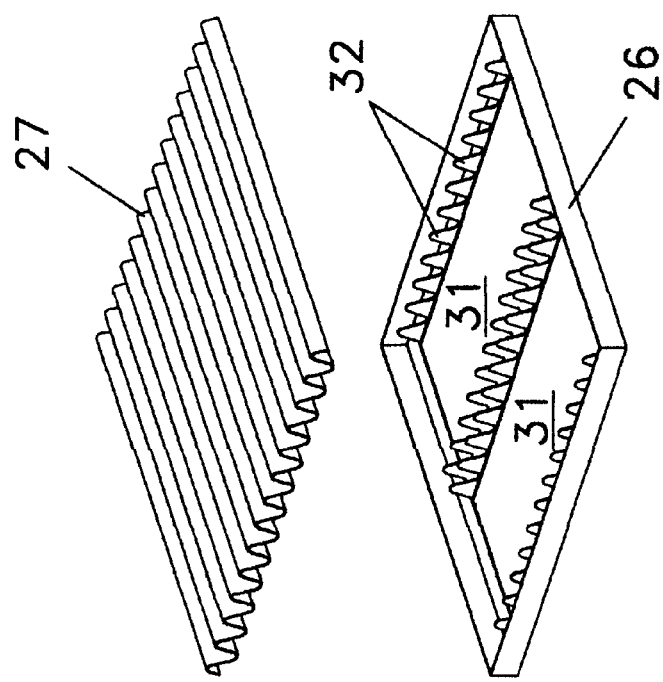
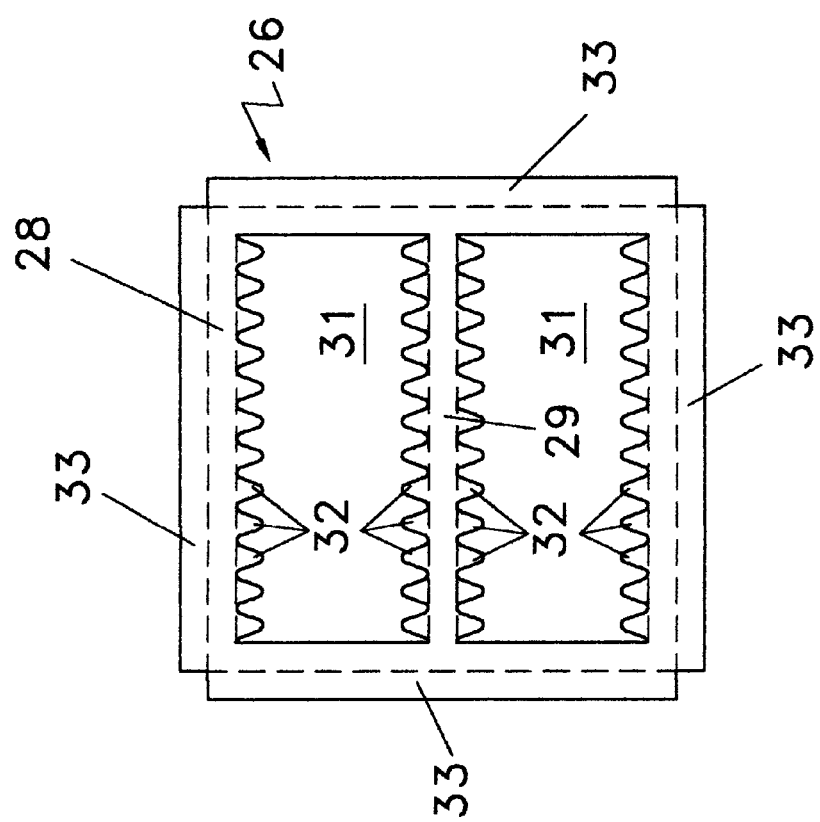
FIG 4
FIG 3

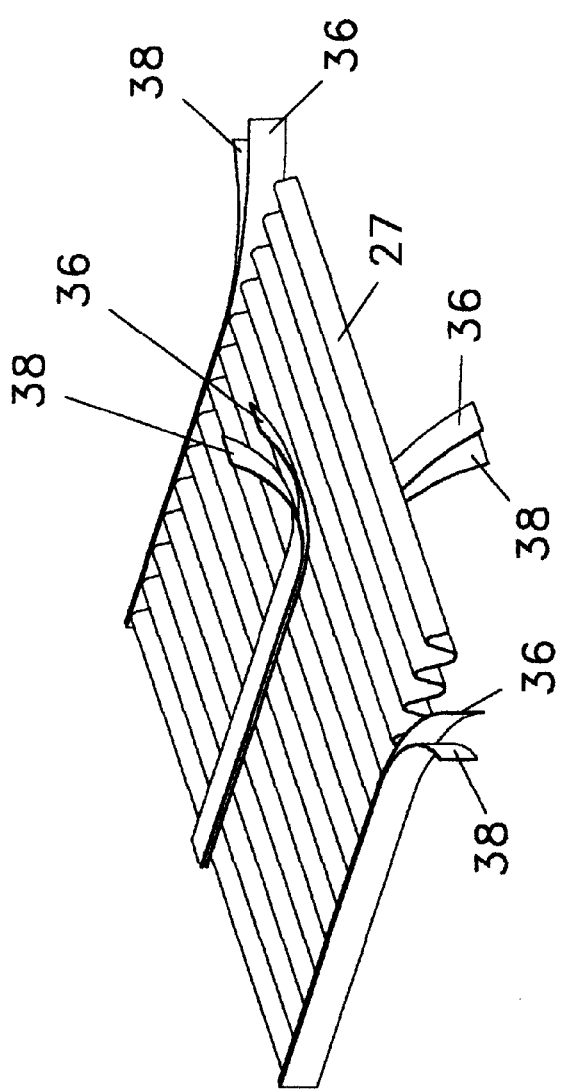
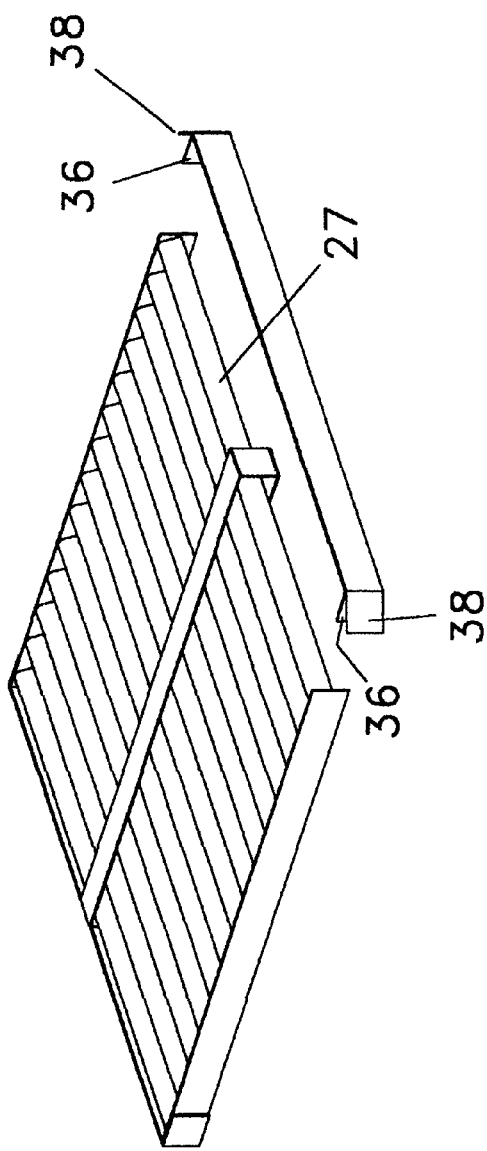
FIG 5
FIG 6

METHOD FOR FORMING FIBROUS FILTER MEDIA, FILTER UNITS AND PRODUCT

BACKGROUND OF THE INVENTION

The present invention relates to a unique and novel method and apparatus for producing filter media and more particularly to a unique method and apparatus for forming filter media into one or more of several preselected configurations and producing novel unit filter structure therefrom.

It has been long known in the filter art to collect filter media issuing from a filter media forming apparatus unto a drum or endless belt in a continuous, elongated sheet and to then process the elongated sheet into a preselected form for subsequent assembly into unit disposable or permanent flow-through frames. In this regard, attention is directed to U.S. Pat. No. 5,725,812, issued to Kyung-Ju Choi on Mar. 10, 1998 and to U.S. patent application Ser. No. 08/677631, filed by Kyung-Ju Choi on Jul. 8, 1996, both of which teach methods of continuously forming fibrous filter media and collecting the endless fibers on a collector drum, including novel air distribution and unique air pulsing arrangements, respectively. In this regard, it is to be understood that the present invention is not to be considered as limited to the novel, non-related fibrous forming method and collection arrangements disclosed on the aforementioned patent and patent application but that other fibrous forming methods can be utilized herewith, including well known chopped fiber forming arrangements which are not disclosed herein. In this regard, attention is further directed to U.S. patent application Ser. No. 09/038,744 filed by Kyung-Yu Choi on Mar. 11, 1998, which teaches an endless belt pleating arrangement and to U.S. Pat. No. 3,849,241, issued to R. R. Butin et al on Nov. 19, 1974; U.S. Pat. No. 3,878,014, issued to J. J. Melead on Apr. 15, 1975; U.S. Pat. No. 4,042,740, issued to D. L. Krueger on Aug. 16, 1977; U.S. Pat. No. 4,656,081, issued to K. Ando et al on Apr. 7, 1987 and U.S. Pat. No. 4,936,934, issued to P. G. Buehning on Jun. 26, 1990. These five patents also teach various arrangements for continuously forming fibrous filter media and collecting the fibers on a collector drum, including respectively: controlling fiber material viscosity levels; varying pressures on the collecting drum; collecting fibers into a network of high density and pillowed low density regions; collecting fibers at an angle to the tangential line of the collecting surface; and collecting fibers on a perforated collector drum at equal air flow rates. None of these patents, either alone or in combination, however teaches or suggests the novel method, apparatus and product disclosed herein wherein fibers are collected on an interchangeable, preselectively contoured forming surface in a straight forward and economical arrangement requiring a minimum of parts and a minimum of operating steps heretofore unknown in the act. In addition attention is directed to U.S. Pat. No. 5,643,653, issued to H. L. Griesbach III, et al on July 1997, which broadly teaches collecting randomly emitted fibers unto a moveable forming surface.

In accordance with the present invention, a unique fiber collector surface arrangement is provided which allows for ready interchangeability of the contour surface to be utilized and which, at the same time allows for ready velocity and temperature control. In addition, the present invention provides for a novel transferring, binder and temperature treating arrangement of the uniquely contour formed fibrous material and further provides a unique unit framing arrangement and unit product for the formed and treated material.

Various other features of the present invention will become obvious to one skilled in the art upon reading the disclosure set forth herein.

BRIEF SUMMARY OF THE PRESENT INVENTION

More particularly the present invention provides a method of forming fibrous filter media comprising: selected and fastening a preselected, interchangeable, contoured surface on a moveable collector to be disposed in a forming zone; feeding filter media fibers in at least one separate and distinct layer from a spaced media supply zone unto the preselectively contoured surface on the moveable collector in the forming zone to contour shape a filter mat to conform with the preselectively corresponding contoured surface fastened on the moveable collector; and, feeding the conformed contour shaped filter mat from the forming zone to a further filter mat treating zone. In addition the present invention provides a novel apparatus for the forming fibrous filter media comprising: a fiber media forming means having a plurality of spaced die sets, each set including a plurality of spaced apertures arranged to dispense aligned fibrous strands therefrom in layer form; a mat forming collector means having an interchangeable contoured surface positioned in relatively movable spaced relation below the forming means to successively receive each aligned layer form from each die set at the forming means to preselectively contour shape stacked mat layers successively received from the forming means; and transfer means cooperatively positioned with respect to the collector means to receive contour-shaped mats therefrom to transfer the mats to other work stations for further processing. Further, the present invention provides novel flow-through frame members for the contour shaped fibrous filter media of disposable or permanent material including disposable and permanent holding members arranged to retain the contour shaped layers of fibrous filter media in fixed and stable position in the surrounding frame.

It is to be understood that various changes can be made by one skilled in the art in one or more of the several steps of the method and in one or more of the several parts of the novel apparatus and products as disclosed herein without departing from the scope or spirit of the present invention.

BRIEF DESCRIPTION OF THE DRAWINGS

Referring to the drawings which disclose one advantageous embodiment of the present invention and the novel arrangements which can be utilized therewith:

FIG. 3 is a top plan view of a novel unique flow-through disposable frame blank which can be employed with pleated fiber filter media formed in accordance with the present invention;

FIG. 4 is an isometric, exploded view of a novel unit filter utilizing the filter media formed in accordance with the arrangement of FIGS. 1 and 2 and a unique flow-through frame like that of FIGS. 3 and 4;

FIG. 5 is an isometric, partial, broken-away, exploded view of a further novel disposable unit filter also utilizing filter media formed in accordance with the plan arrangement of FIGS. 1 and 2 with another novel flow-through disposable frame arrangement;

FIG. 6 is an isometric assembled view of the unit filter of FIG. 5;

DESCRIPTION OF THE INVENTION

Figure 1:
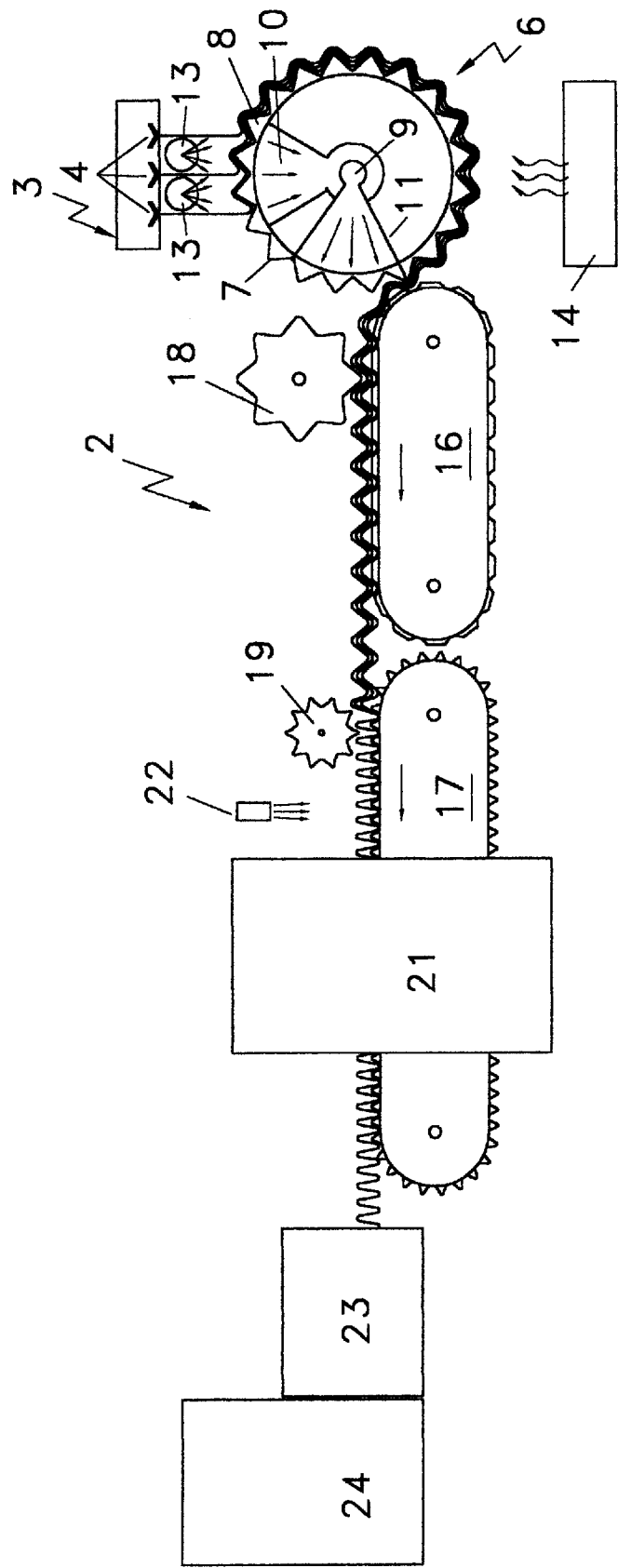
FIG. 1 is a side view of a schematic plan arrangement of the novel apparatus which can be utilized to carry out the several steps of the novel method for producing the unique product as described herein.

Referring to the schematic side plan view in FIG. 1 of the drawings, the novel apparatus 2 is schematically shown to include a fibrous filter media supply source which is here schematically shown as a heated, fiber filter media forming die head 3 having a plurality of spaced, aligned aperture rows 4 arranged to dispense rows of fibrous filter media strands therefrom in heated mat layers. It is to be understood that any one of a number of filter media supply source arrangements known in the art can be utilized for dispensing fibrous filter media mats. Advantageously, the filter media supply source can be a melt blown die assembly such as disclosed in the aforementioned U.S. Pat. No. 5,725,812 and in U.S. patent application Ser. No. 08/677,631, but other filter media supply sources can be utilized as well, even including source arrangements which dispense fibrous filter media mat in chopped mat form. In accordance with one feature of the present invention, the fibrous filter supply source, in this instance, the die head 3 can be arranged to include aligned, spaced apertures of varying aperture area sizes, so that the mat forming layers of a first mat layer are larger in cross-sectional area than the cross-sectional area of layer fibers in a successive mat layer of fibers with aligned fibers in further successive mat layers being of successively diminishing cross-sectional area. In this regard, it is to be understood that any one of a number of preselected filter media mat layers can be produced with the cross-sectional areas of fibers of each successive mat layer being preselectively varied in accordance with the desired characteristics that might be sought for the final manufactured product.

Figure 2:
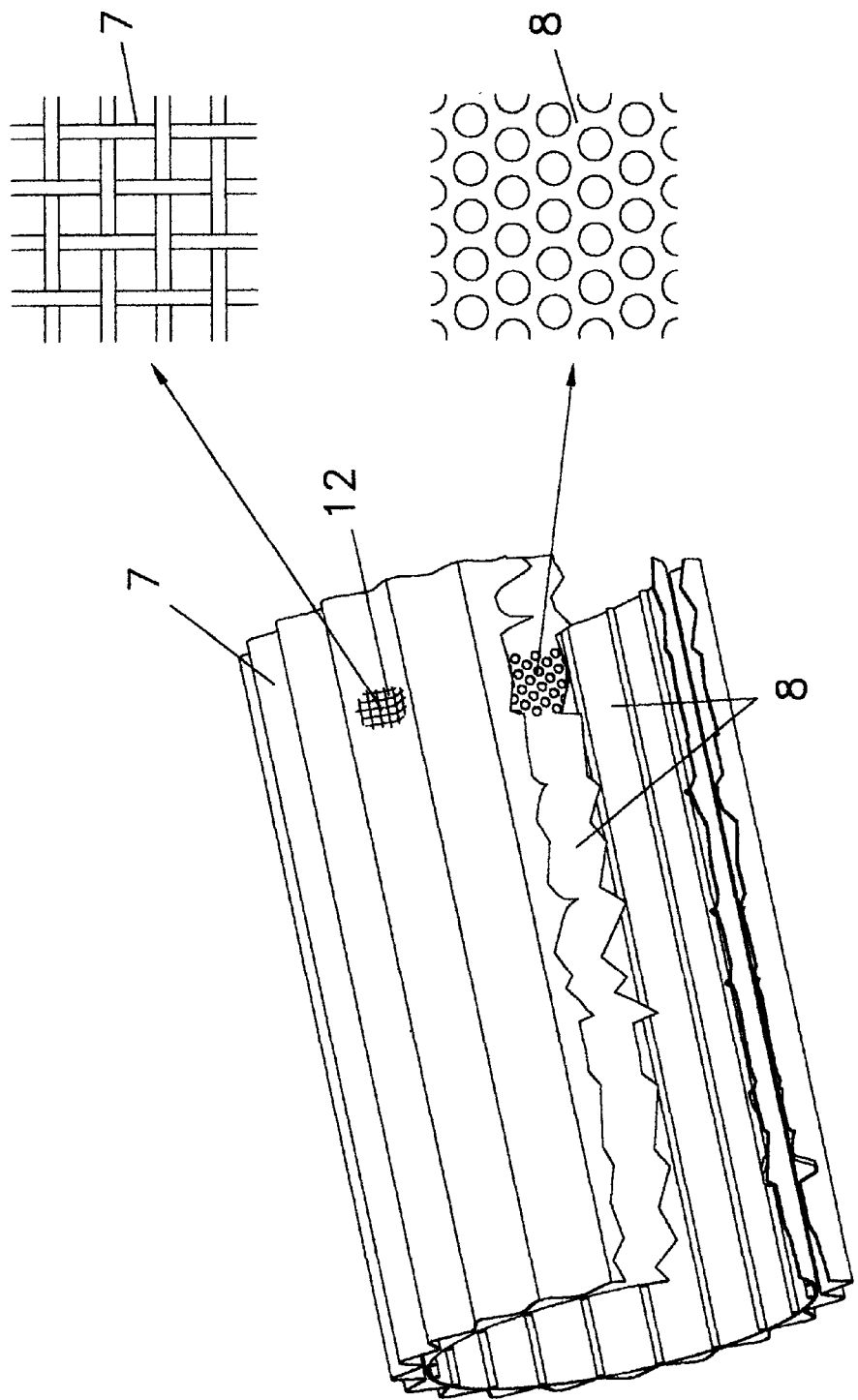
FIG. 2 is an enlarged, partial, broken away, isometric view of a portion of the novel pleat forming drum which can be utilized in the arrangement of FIG. 1.

As shown in FIG. 1, a rotatable collector drum 6 is schematically shown as preselectively spaced below the die head 3 to successively receive the aligned rows of fibers forming the fibrous mat layers from the aligned, spaced, aperture rows 4 of the die head 3 so that the superposed layers, which are received on collector drum 6, can have strands of diminishing, cross-sectional area from the top to bottom layers. Referring to FIG. 2 of the drawings, it can be seen that rotatable collector drum 6 can be so formed as to include an interchangeable outer pleated flexible porous screen peripheral surface 7 which can be preselectively formed from suitable flexible metallic or plastic wire screen to include successively spaced pleats of preselectively constant or selective variable depth. A flexible perforated back-up sheet 8 can be utilized to afford the rotatable drum structural stability. It is to be understood that drum 6 (FIG. 1) can be of a hollow nature to accommodate a fluid treating assembly 9 therein including a vacuum arm 10 and a flared broadcast arm 11 which serves to transmit a cooling fluid such as air through the interchangeable perforated back-up sheet 8 and removable corrugated wire screen 7 unto the layered mat which is received and formed in pleated shape on the peripheral surface of rotatable drum 6. It is to be understood that suitable end plates and variable speed drive motor and gearing (not shown) can be employed to rotatably drive collector drum 6 at preselected speeds to receive the fibrous filter layers from die head 3. As can be seen particularly in FIG. 2, the removable peripheral corrugated wire screen 7 and the perforated back-up sheet 8 are each provided with appropriate apertures 12 which can be aligned to receive a fastening member (not shown) to hold the drum sheets in a cylindrical mat receiving form and to allow for a ready interchange of outer peripheral wire screens 7, each corrugated with a preselected forming contour.

Referring to FIG. 1, it can be seen that appropriate binder material dispensers 13 can be positioned above interchangeable rotatable drum 6 and below die head apertures rows 4 to dispense a suitable mat binding material between and unto the formed fibrous filter mats as they initially reach the screen wire surface 7 of rotatable drum 6. A suitable heater 14, here shown as positioned in spaced relation below rotatable drum 6 serves to direct a mildly heated forming fluid unto the drum receiving peripheral surface. As a formed mat exits the drum, a fluid cooling agent from a fluid cooler broadcast arm 11 positioned within rotatable drum 6, is directed against the mat by such flared broadcast arm 11.

Cooperating with and adjacent rotating drum 6 are two aligned transfer assemblies in the form of endless belts 16 and 17. Belt 16, adjacent drum 6, is driven at a selected speed compatible with the peripheral speed of rotating drum 6 to accept the pleat formed fibrous filter material from drum 6 with the corrugated formations on both belt 16 and on a superposed rotating pleat spacer 18, which is positioned in spaced relation above the inlet end of endless belt 16, being so contoured as to maintain the pleats in substantially the same configuration as initially formed on rotatable drum 6. In this regard, it is to be noted that the adjacent endless belt 17, which is aligned with belt 16 and the superposed pleat spacer 19 positioned thereabove advantageously both have corrugated formations which are of lesser configuration than the corrugated formations on endless belt 16 and pleat spacer 18 thereabove with endless belt 17 being driven at a preselected slower speed than the speed of endless belt 16. This arrangement results in the gathering and the elevation of the pleat formed material as it is transferred from one endless belt zone or station 16 to the next endless belt zone or station 17. It is to be understood that a suitable drive motor and gear assembly (not shown) can be connected to the aligned endless belts 16 and 17 and superposed pleat spacers 18 and 19 thereabove to transfer the pleated material to a desired location.

Prior to temperature soaking of the pleated material in oven 21 through which endless belt 17 can be arranged to pass, and if desired, binder material dispenser 22 can be employed above endless belt 17 to add additional binding material to the pleat formed fibrous filter material if desired.

Once the pleat formed fibrous filter material has been temperature soaked for a preselected time period and at a preselected temperature, it can then be severed into separate filter units by a suitable mechanical or other severing device 23 and then assembled with appropriate frames at station 24, severing device 23 and framing station 24 being shown only in block form on the schematic illustration of FIG. 1.

It is to be understood that in accordance with one embodiment of the present invention, the above described binder dispensers 13 and 22, flared broadcast arm 11 transmitting a cooling fluid, heater 14, and temperature soaking oven 21, can all, or one or more of the same, be eliminated, it only being necessary that the fibers fed from the media supply zone to the movable collector be sufficiently heated either in the spaced media supply zone or at least before reaching the collector in the forming zone to allow such fibers to reach a preselected melt stage to enhance bonding.

As can be seen in FIGS. 3 and 4 of the drawings, one novel disposable frame blank 26 (FIG. 3) is disclosed. Blank 26 can be formed by stamping a suitably selected cardboard or plastic material and can be appropriately sized and shaped in accordance with the unit filter media 27 (FIG. 4) formed, treated, and severed in accordance with the aforedescribed novel arrangement described herein and disclosed in FIGS. 1 and 2 of the drawings. The main body 28 of blank 26 is here shown as being rectangular in shape to include intermediate rib member 29 and flow-through passages 31. A plurality of tabs 32 extending from body 28 and rib 29 serve as pleat spacers when the blank is set-up as a frame by folding both the tabs 32 along with sides 33 also extending from the outer periphery of body 28 at right angles. Referring to FIG. 4 of the drawings, a set-up unit frame 26 is shown in position to receive the novel filter unit 27 with the several pleats having the side walls thereof nesting along the side flanks of tabs 32 on one face of unit filter media 27. It is to be understood that appropriate mechanical fasteners or fastening glue can be provided between engaging parts to aid in the stability of the assembled unit filter frame.

Referring to FIGS. 5 and 6 of the drawings, still another novel frame assembly is disclosed for utilization with novel unit filter media 27, which has been formed, treated and severed in accordance with the aforedescribed novel arrangement described herein and disclosed in FIGS. 1 and 2 of the drawings. In this arrangement, flexible tape strips 36, including adhesive materials along opposite faces thereof, each have one adhesive face fastened to opposed peripheral edges of the pleats of filter unit 27 and to pleat crests intermediate the opposed edges. Stiffening strips 38 are then fastened to tape strips 36 to provide a stable framed unit filter.

Figure 7:
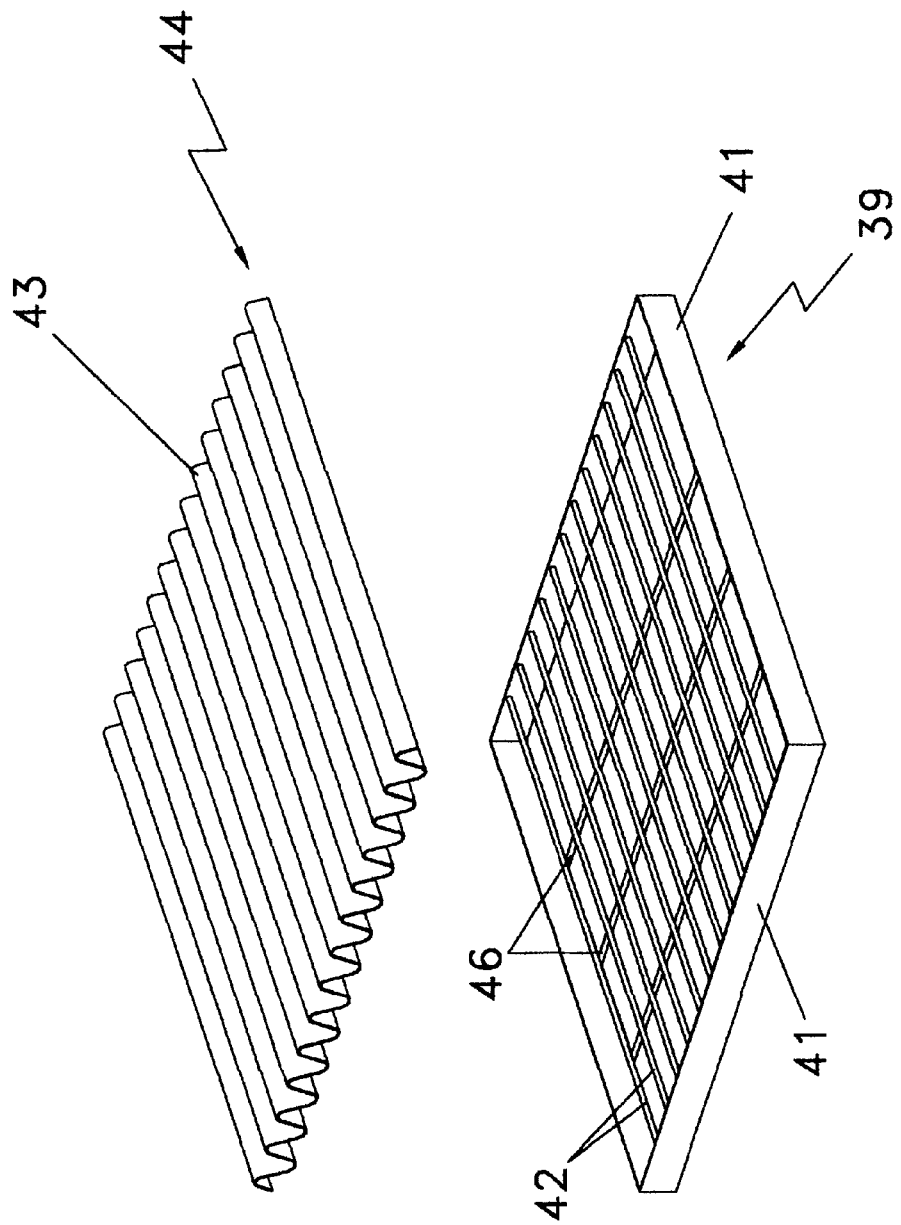
FIG. 7 is still another isometric assembled view of another unit filter.

Referring to exploded FIG. 7 of the drawings, a blank flow-through frame 39 with end fastened side panels 41 is disclosed. It is to be understood that frame 39 can be formed from either disposable or permanent materials. Frame 39 is provided with a plurality of spaced pleat support rod members 42 which extend in one plane thereacross and which are fastened at their opposite ends to the corresponding edges of one pair of opposed sides 41 of flow-through frame 39. These pleat support rods 42 serve to nest with the crests 43 of pleated filter medium unit 44—which can be formed in the novel arrangement as above described. A second set of spaced filter unit support rods 46 extend in a spaced plane from the plane of rods 42 and are fastened to the opposite corresponding edges of a pair of opposed sides 41 of flow-through frame 39. These spaced rods 46 serve to support the valleys of pleated unit filter medium 44 and to add to the general stability of flow-through frame 39.

Figure 8:
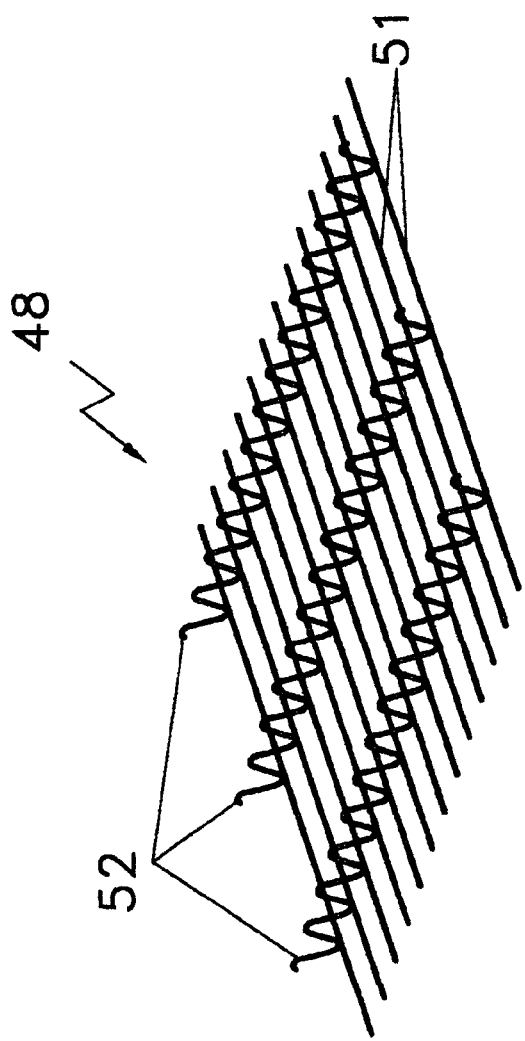
FIG. 8 is an isometric view of a permanent rod support arrangement for pleated media such as produced by the novel media arrangement of FIGS. 1 and 2; and, FIG. 9 is an isometric view of the permanent rod support arrangement of FIG. 8 assembled in a permanent frame to receive novel pleated filter media.
Figure 9:
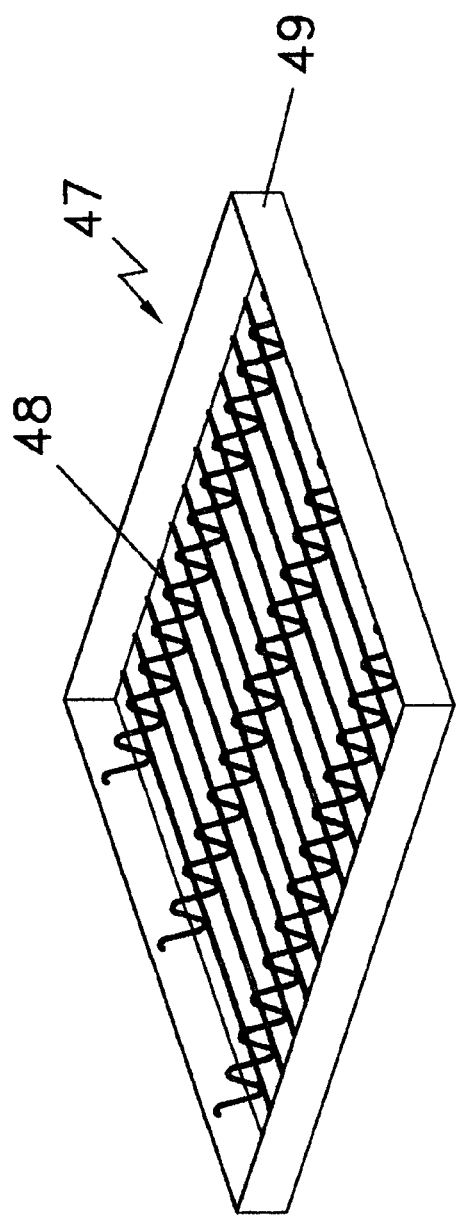

Referring to FIGS. 8 and 9 of the drawings, still another novel embodiment of a unit filter frame assembly 47 is disclosed. This flow-through frame assembly 47, like flow-through frame 44 above described, advantageously can be formed from permanent materials but the concept thereof can also be employed with disposable materials. As can be particularly seen in FIG. 8 of the drawings, a unified pleat support arrangement 48 is sized and configured to nestingly engage and be suitably fastened in flow-through fame 49. Unified pleat support arrangement (FIG. 8) includes a plurality of spaced support rods 51 extending in a common plane and having fastened thereto in a perpendicular fashion, the spaced transversely extending corrugated rod members 52. Corrugated rod members 52 serve to receive and support the crests of a pleated filter medium unit, such as the crests 43 of filter medium unit 44 of FIG. 7. The assembled unit, including straight support rod members 51, transverse corrugated rod members 52 and the supported pleated filter medium are then disposed in unit filter frame 49 for further fastening as necessary.

It is to be understood—as above noted—that any one of a number of types of fasteners can be employed in the disposable frame arrangements disclosed herein and that, if desired, permanent filter frames of heavier, more durable materials can be employed.

The invention claimed is:

1. A method of forming fibrous filter media comprising: selecting and fastening a preselected contoured surface on a movable collector to be removably disposed in a forming zone; feeding filter media fibers in at least one separate and distinct layer from a spaced media supply zone unto said preselectively contoured surface on said movable collector in said forming zone to contour-shape a filter mat to conform with said preselectively corresponding contoured surface fastened on said movable collector; feeding said conformed contour-shaped filter mat from said forming zone to a transfer zone to transfer said conformed contour-shaped filter mat from said forming zone to a further filter mat treating zone; and, moving said conformed contour-shaped filter mat while in said transfer zone at preselected differing speeds and along differing contoured surfaces to preselectively vary the shape of said conformed contour-shaped filter mat.

2. The method of forming fibrous filter media of claim 1, and temperature soaking said conformed contour-shaped filter mat to a controlled temperature prior to further processing of said contour shaped filter mat.

3. The method of forming fibrous filter media of claim 1, wherein filter media fibers are fed sequentially from said media supply zone to said movable collector to be layered as at least two separate and distinct layers to provide said conformed contour-shaped filter mat.

4. The method of forming fibrous filter media of claim 1, wherein said preselected contoured surface fastened to said movable collector is changed to a different contoured surface.

5. The method of forming fibrous filter media of claim 1, wherein said filter media fibers are fed in heated form from said media supply zone to said contoured movable collector surface in said forming zone.

6. The method of forming fibrous filter media of claim 5, wherein said fibers are in a preselected melt stage before reaching said contoured collector surface in said forming zone.

7. The method of forming filter media of claim 1, including the step of adding a suitable binder material to said filter media fibers.

8. The method of forming filter media of claim 7, wherein said binder material is added as said filter media fibers are fed to said filter mat conforming zone.

9. The method of forming filter media of claim 8, wherein said binder material is in fibrous form.

10. The method of forming filter media of claim 7, wherein a supplemental binder material is added in said transfer zone.

11. The method of forming filter media of claim 1, including applying a preselectively mild heat to said conformed contour shaped filter mat while in said forming zone.

12. The method of forming filter media of claim 1, including applying a preselectively cooling fluid stream to said conformed contour shaped filter mat as it is fed from said forming zone to said transfer zone.

13. The method of forming fibrous filter media of claim 1, wherein filter media fibers of differing cross-sectional areas are fed sequentially from said media supply zone to be layered as at least two separate and distinct layers with differing cross-sectional area fibers in adjacent layers which provides said conformed contour-shaped filter mat.

14. The method of forming fibrous filter media of claim 13, wherein said conformed contour-shaped filter mat with at least, two separate and distinct layers with differing cross-sectional area fibers in adjacent layers are fed to said transfer zone so that the layer of largest cross-sectional area is the upper-most layer.

15. The method of forming fibrous filter media of claim 1, wherein said preselectively contoured movable collector surface is contour-shaped to form a pleated filter mat.

16. The method of forming fibrous filter media of claim 15, including the step of passing said pleated filter mat as it leaves a temperature treating zone to a unit filter severing zone to sever said mat into individual pleated unit filters, each unit including pleats with successive crests and valleys.

17. The method of forming fibrous filter media of claim 16, including the step of passing said individual pleated unit filters to a framing zone to assemble each unit filter into a flow-through frame having fastening members cooperatively disposed to maintain said successive crests and valleys of each unit filter in position.

18. The method of forming fibrous filtering media of claim 17, wherein said flow-through frames are formed to include a flexible disposable material which includes fastening tab members sized to be turned to nest with said valleys between said crests.

19. The method of forming fibrous filter media of claim 17, wherein said flow-through frame is a permanent frame.

20. The method of forming fibrous filtering media of claim 17, wherein each of said flow-through frames is formed to include spaced transversely extending rod members sized to nest with said valleys between said crests.

21. The method of forming fibrous filtering media of claim 17, wherein each of said flow-through frames is formed to include adhesive tape members extending along the opposed peripheral edges of said unit filter.

22. The method of forming fibrous filtering media of claim 21, wherein at least one adhesive tape member extends intermediate send tapes along the peripheral edges.

23. The method of forming fibrous filter media of claim 17, wherein each of said flow-through frames is of a material to include a flow-through frame having a first set of spaced support rods extending in a first plane therein to support said crests of individual pleated unit filters and a second set of spaced support rods extending transversely to said first set of spaced support rods extending in a second plane therein to support said valleys of individual pleated unit filters.

24. The method of forming fibrous filter media of claim 23, said first set of spaced rods being aligned with said filter media crests to nestingly engage therewith.

25. The method of forming fibrous filter media of claim 23, said first set of spaced rods being corrugated to include crests nestingly engaging with said filter media crests and valleys fastened to said second set of spaced rods.

26. A method of forming fibrous filter comprising: selecting and fastening a preselected contoured surface on a movable collector to be removably disposed in a pleat forming zone; sequentially feeding filter media fibers in heated form from at least two spaced die orifice first and second sets with the die orifices of said first set including preselective larger cross-sectional area fibers than the preselective crosssectional area fibers of said die orifices of said second set, said fibers of said first and second sets collecting as first and second fiber mats unto an interchangeable preselectively successively recessed contour-shaped pleat forming rotating collector surface of the pleat forming zone with the larger cross-sectional area fiber mat of said first set superposed and covered by the smaller crosssectional area fiber mat of said second set and with the first and second fiber mats conforming with said pleat forming rotating collector surfaces; applying a binder fiber between said spaced die orifice first and second sets to collect between said first and second fiber mats in said pleat forming collector surface of said forming zone; feeding said conformed pleat contoured first and second filter fibers mats while in said forming zone in a rotating fashion to a transfer zone while intermediately applying a preselectively mild heat thereto; applying a cooling fluid to said superposed pleated mats as they enter said transfer zone with the relative position of said superposed mats as a consequence of rotation being reversed in said transfer zone; moving said pleat formed superposed mats while in said transfer zone at preselectively and comparatively differing first and second speeds and differing first and second configurations to preselectively vary the configuration of said pleated superposed mats; introducing said pleated superposed mats from said transfer zone into a temperature treating zone to temperature soak said superposed mats to a controlled temperature level; passing said pleated superposed mats to a severing zone to sever the same into individual pleated unit filters with each unit including successive crests and valleys; and, passing said individual pleated unit filters to a frame zone to assemble each unit filter into a flow-through frame having fastening members cooperatively disposed to maintain said successive crests and valleys of each unit filter in position.

* * * * *